United States Patent [19]
Miyashita

[11] Patent Number: 5,933,433
[45] Date of Patent: Aug. 3, 1999

[54] METHOD AND SYSTEM FOR RECEPTION TIMING CONTROL

[75] Inventor: Hideo Miyashita, Tokyo, Japan

[73] Assignee: NEC Corporation, Tokyo, Japan

[21] Appl. No.: 08/834,632

[22] Filed: Apr. 14, 1997

[30] Foreign Application Priority Data

Apr. 15, 1996 [JP] Japan .................................. 8-092083

[51] Int. Cl.$^6$ ........................................................ H04J 3/06
[52] U.S. Cl. .......................................... 370/508; 370/350
[58] Field of Search .................................. 375/350, 346,
375/356, 357, 371, 373, 327, 362; 371/47.1;
370/313, 314, 321, 324, 503, 588, 519,
337, 347, 349; 455/504, 506

[56] References Cited

U.S. PATENT DOCUMENTS

| | | | |
|---|---|---|---|
| 4,561,099 | 12/1985 | Atsugi et al. ............................ | 375/344 |
| 4,887,266 | 12/1989 | Neve et al. .............................. | 370/349 |
| 5,031,197 | 7/1991 | Hespeit et al. ........................... | 375/344 |
| 5,249,205 | 9/1993 | Chennakeshi et al. ................. | 375/349 |
| 5,309,439 | 5/1994 | Roos ....................................... | 370/508 |
| 5,339,335 | 8/1994 | Molnar .................................... | 375/350 |
| 5,455,844 | 10/1995 | Ishikawa et al. ........................ | 375/232 |
| 5,519,605 | 5/1996 | Crawlfield ............................... | 364/151 |
| 5,524,029 | 6/1996 | Takenaka et al. ....................... | 375/356 |
| 5,604,745 | 2/1997 | Hijii ........................................ | 370/347 |

FOREIGN PATENT DOCUMENTS

| | | |
|---|---|---|
| 0 318 685 A2 | 6/1989 | European Pat. Off. . |
| 2 135 855 | 9/1994 | United Kingdom . |

*Primary Examiner*—Chau Nguyen
*Assistant Examiner*—Kenneth Vanderpuye
*Attorney, Agent, or Firm*—Scully, Scott Murphy & Presser

[57] ABSTRACT

With an object being the overall reduction of error in systems wherein reception timing is controlled by detecting the timing error of the received signal even when the signal arrival path varies in multipath communication and similar conditions, the present invention comprises a timing error detection means 3 which detects errors between the time slot reception time and reception timing of the received signal, a reception timing control means 1 which controls the reception timing of the slot on the basis of errors at reception of preceding time slots, and a control adjustment means 2 which adjusts the amount of control of the reception timing in relation to the errors detected, the control adjustment means 2 making it possible, by taking the time average of each error detected during reception of a plurality of time slots, to fix the error in the vicinity of the maximum frequency of timing delay distribution, even where there are variations in error resulting from variations in the arrival path of the received signal in multipath communication and similar conditions, thus effectively facilitating the overall reduction of errors of reception timing in the receiver.

10 Claims, 3 Drawing Sheets

METHOD AND SYSTEM FOR RECEPTION TIMING CONTROL

BACKGROUND OF THE INVENTION

1. Field of the Invention

The present invention relates to a receiver for use with a TDM (time-divisional multiplex) or TDMA (time-divisional multiplex access) mobile communications system employing digital modulation, and in particular to signal reception timing control.

2. Description of the Prior Art

Generally speaking, in TDM or TDMA radio systems the selective reception of a required signal from a time-divisional multiplex channel wherein it has been allocated a unit time slot and multiplexed demands that the reception time be synchronized with the time slot. With a digitally modulated signal it is also necessary for demodulation to be performed with a timing which is synchronized with the symbol timing of the signal. In receivers adapted to process digitally modulated signals, reception time is controlled in such a way as to fulfil these conditions, and this reception time synchronized with the received signal is referred to as reception timing.

As is shown in the block diagram in FIG. 1, the conventional method of reception timing control as described above involves the provision of a timing error detection means 3 upstream from the demodulation means 4 that demodulates the received signal, so that errors between signal time slot reception time and reception timing can be detected, and the reception timing of a given time slot is controlled in the reception timing control means 1 by the error output from the timing error detection means 3 at the time of reception of the preceding time slot.

With this conventional method of reception timing control, the timing of a given time slot is determined solely by the immediately preceding time slot. In the absence of any difference in arrival path between a given time slot and the preceding time slot, this method does not give rise to any substantial error between reception timing and the timing of the given slot. However, the existence of multiple arrival paths (multipath) means that there may be a substantial difference in the arrival paths of the given time slot and the preceding time slot, in which case a considerable error will occur between reception timing and the timing of the given time slot. This leads to poorer communication quality as a result of reduced accuracy of demodulation. In this way, conventional methods of reception timing control are susceptible to deterioration in quality in multipath communication.

SUMMARY OF THE INVENTION

It is an object of the present invention to provide a method of reception timing control such that even in multipath communication it is possible to avoid the occurrence of any substantial errors between reception timing and the timing of a given slot, thus inhibiting deterioration of quality.

The present invention is a TDM receiver with a timing error detection means for detecting errors between the time slot reception time and reception timing of received signals, and a reception timing control means for controlling the reception timing of a given slot by means of the output of the timing error detection means on reception of the preceding time slot, characterized by a control adjustment means for adjusting the amount of control of the reception timing in relation to errors detected by the timing error detection means. This control adjustment means is configured in such a way as to take the time average of the errors detected by the timing error detection means. Moreover, it is desirable that it applies a weighting to each error when receiving a plurality of preceding time slots, the weighting being lower in direct proportion to the age of the error. Alternatively it is desirable that the number of slots whereof the errors are targeted for the taking of time averages is determined on the basis of cycles of changing environmental conditions, fading frequencies and detected slot frequencies.

BRIEF DESCRIPTION OF THE DRAWINGS

FIG. 3A is a time chart which demonstrates the timing of reception timing control according to the method to which the present invention pertains, while

DETAILED DESCRIPTION OF THE PREFERRED EMBODIMENTS

There follows a description of a preferred embodiment of the present invention with reference to the drawings.

Figure 1:
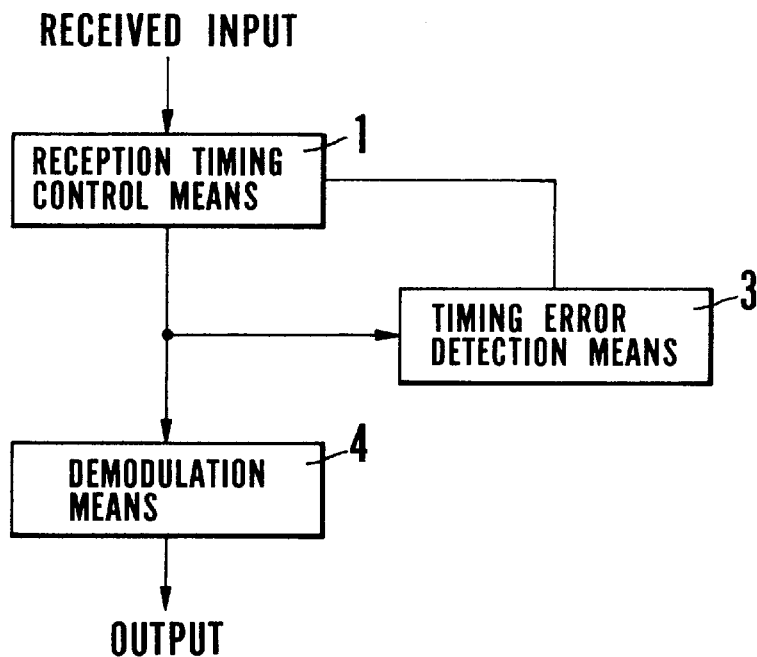
FIG. 1 is a block diagram illustrating a conventional receiver.
Figure 2:
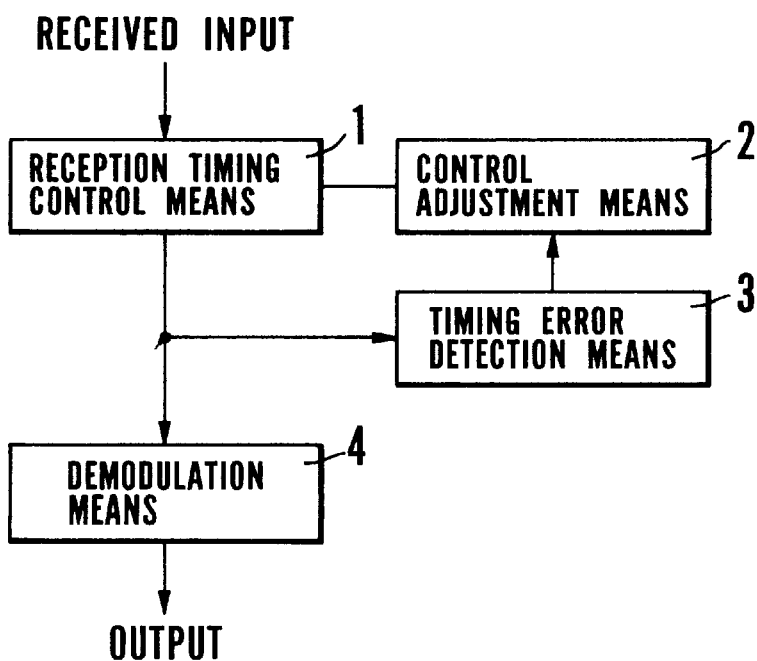
FIG. 2 is a block diagram illustrating an embodiment of the method of reception timing control to which the present invention pertains.

FIG. 2 is a block diagram illustrating an embodiment of the method of reception timing control to which the present invention pertains. Insofar as it is equipped at a stage prior to the demodulation means 4, whereby received input is demodulated, with a timing error detection means 3, which detects errors between the time slot reception time and reception timing of the received input, and a reception timing control means 1, which controls the reception timing of a given time slot by means of the output from the timing error detection means 3 at reception of the preceding time slot, its configuration is the same as that of conventional TDM receivers. In addition to this configuration it is here equipped with a control adjustment means 2 which adjusts the amount of control of the reception timing in relation to errors detected by the timing error detection means 3.

There now follows a description of the operation of a receiver of the configuration illustrated in FIG. 2. In conditions of multipath fading including a considerable delay, optimum reception timing differs slot by slot, with the result that the timing of the preceding slot is not necessarily the optimum one. It has already been pointed out that differences between reception timing and the timing of a given time slot lead to reduced accuracy of demodulation. Analysis of the timing of a plurality of time slots shows that the time distribution of timings correlates with the delay distribution. As FIG. 4 demonstrates, delay distribution exhibits a spread from 0 (shortest arrival path) to maximum delay, and centers on the delay variance value. Maximum frequency is in the vicinity of the delay variance value. Consequently it may be inferred that the probability of enabling reception with optimum timing will be greatest if reception timing can be controlled to conform to the point of maximum frequency of distribution.

Moreover, since the point of maximum distribution corresponds more or less with the mean value, it will suffice to take the time average of the errors. Given a method as described above whereby the reception timing of a given slot is controlled by detecting the error at the preceding slot, the mean value for reception timing can be obtained by averaging the cumulative detected error of all the preceding slots to each other slot and adding this to the initial timing. Thus, in the configuration illustrated in FIG. 2, it is possible, by taking the time average of the errors detected by the control adjustment means 2, to determine the total average value from the start and to obtain an adjusted error. For instance, the average timing as far as no. 4 may be detected in the following manner.

$$\text{Average timing}=\alpha+[A+(A+B)+(A+B+C)+(A+B+C+D)]/4=\alpha+(4A+3B+2C+D)/4$$

(where $\alpha$=the initial timing, A=the first detected error, B=the second error, C=the third error, and D=the fourth error)

However, the fact that delay variance is continually changing means that if the time average taken is too long, it becomes impossible for it to adapt to the change, and the result is the opposite effect. Consequently, either the number of preceding slots targeted for calculation needs to be controlled, or the older data must be given less weighting. The following is an example of weighted mean timing detection.

$$\text{Average timing}=\alpha+(4aA+3bB+2cC+dD)/4$$

(a=the weighting coefficient against the fourth most recent error, b=the weighting coefficient against the third most recent error, c=the weighting coefficient against the next most recent error, and d=the weighting coefficient against the fourth most recent error)

The number of slots targeted for calculation is determined according to the following formula:

(Number of slots)=(cycle of changing environmental conditions)÷(fading frequency)÷(detected slot frequency)

The cycle of changing environmental conditions differs according to area, time band and other factors, and is chosen to suit the purpose.

The following is a simple method of ensuring lower weighting for older error data. Weighting (¼, ⅓, ½) applied in the order of age to the above calculation of mean timing gives:

$$\text{Controlled timing}=\alpha+[(4\times¼)A+(3\times⅓)B+(2\times½)C+dD]/4=\alpha+A/4+B/4+C/4+D/4$$

This is equivalent to always counting the fourth most recent timing as the initial value and multiplying the detected errors by ¼. Calculation is easy because all that it demands is that the detected errors be multiplied by a suitable coefficient. Any value will do provided that it is larger than the control resolution and smaller than ½, and it is easily determined if considered in conjunction with the restriction on slot numbers.

Figure 3A:
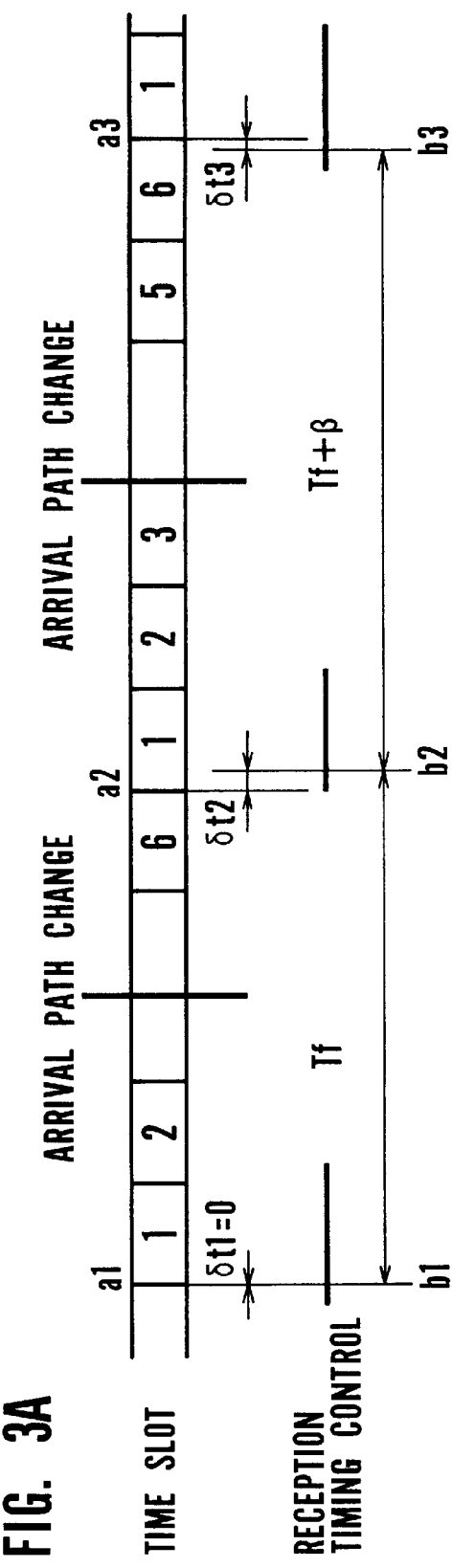
Figure 3B:
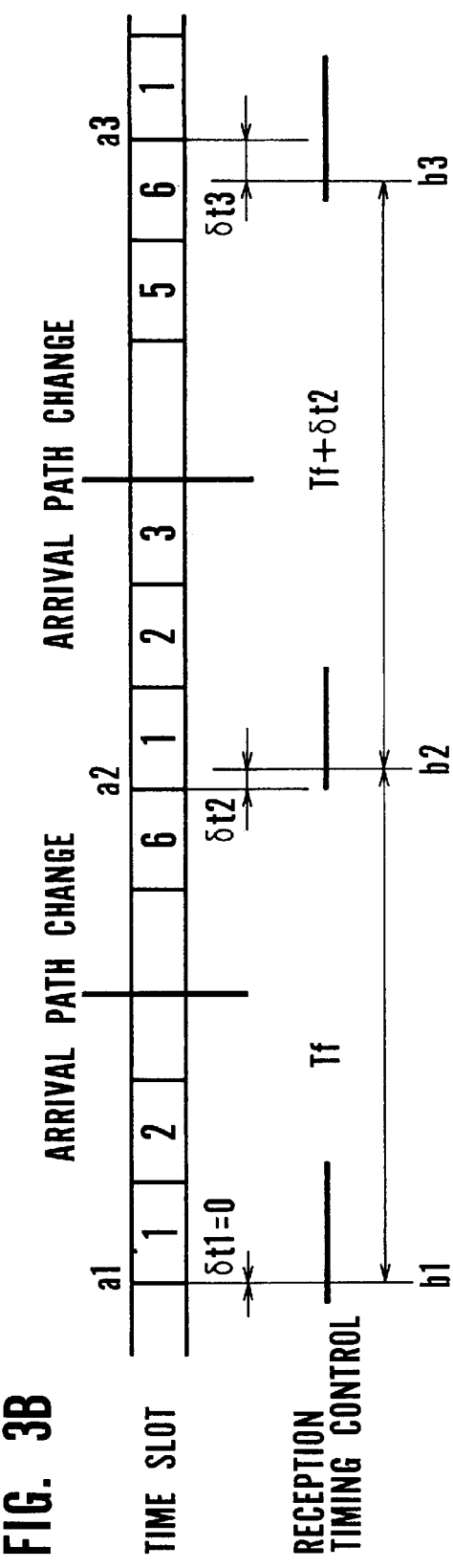
FIG. 3B is a time chart which demonstrates the timing of reception timing control according to the conventional method.

FIG. 3A is a time chart which demonstrates the timing of reception timing control according to the method to which the present invention pertains. FIG. 3B is a similar time chart showing the timing of reception timing control according the conventional method. In the method to which the present invention pertains as illustrated in FIG. 3A, there is initially no error between the timing a1 of the time slot 1 and the reception timing b1 ($\delta t1=0$). Thereafter a change of arrival path occurs, and an error $\delta t2$ is generated in the timing of the next time slot 1 (a negative value because it is earlier than b2). This error is detected by the error detection means 3, and a calculation of the sort described above is performed by the control adjustment means 2. The calculation is, namely:

$$\text{Controlled timing }\beta=\alpha+A/4+B/4+C/4+D/4 =0+0+0+0+\delta t2/4$$

This is added to the interval (frame) between the same time slots Tf and controlled by means of the reception timing control means 1, and reception timing at the timing a3 becomes b3.

It may be pointed out in passing that in FIG. 3B, as in FIG. 3A, there is initially no error between the timing a1 of the time slot 1 and the reception timing b1. Thereafter a change of arrival path occurs, and an error $\delta t2$ is generated in the timing a2 of the next time slot 1. Here the reception timing is controlled to the interval between the same time slots Tf+dt2. This is then again controlled at timing a3 to eliminate any error. However, if the arrival path is changed again before a3 is reached, this control ceases to be valid, and an error $\delta t3$ is generated at the timing a3.

Figure 4:
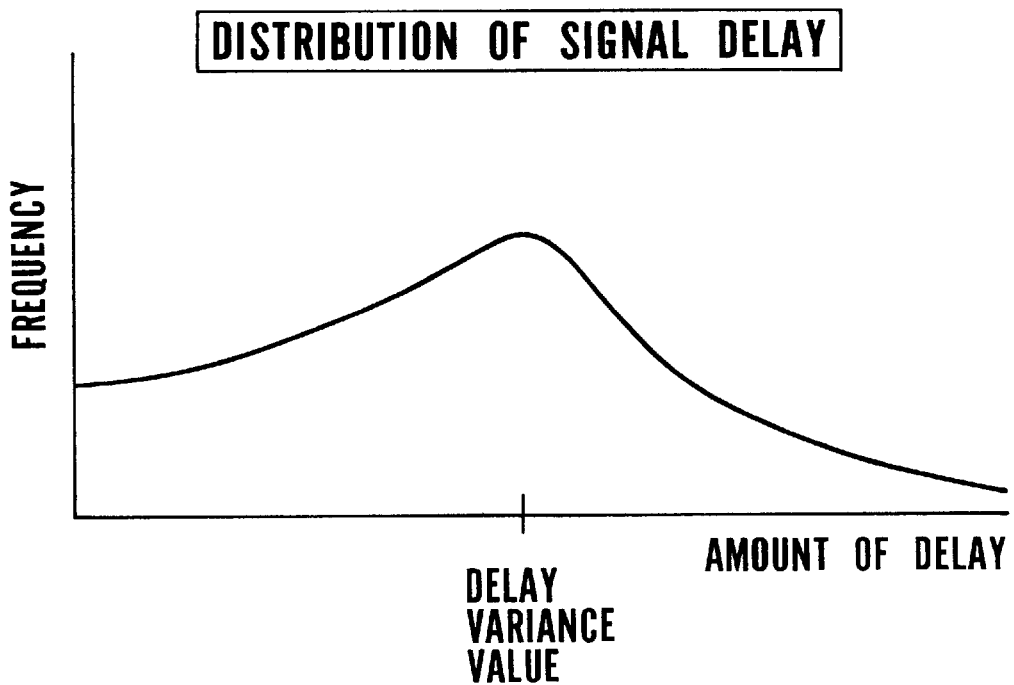
FIG. 4 is a diagram which shows the delay distribution of signals under conditions of actual use.
Figure 5:
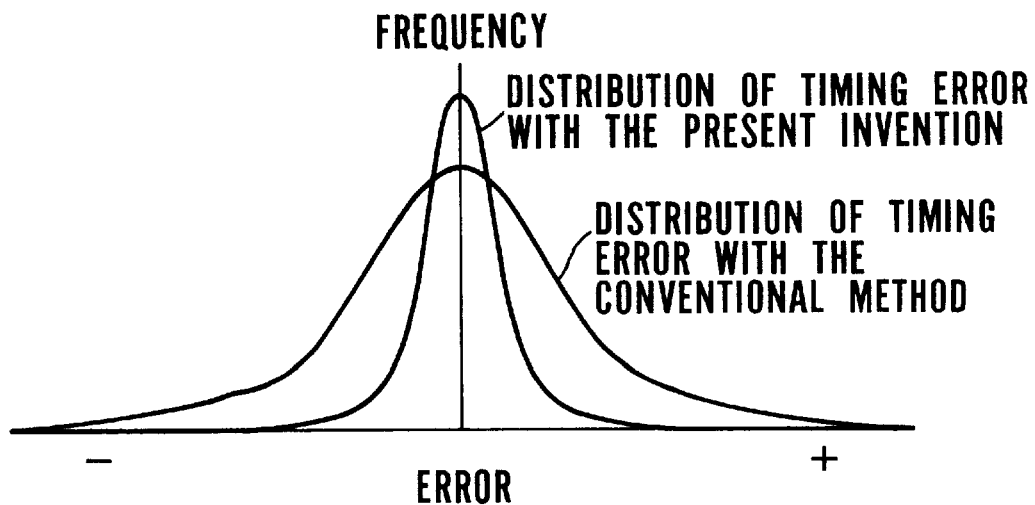
FIG. 5 is a diagram which shows the frequency of error in reception timing according to the present method and the conventional method.

The difference results from the fact that the signal delay distribution, as FIG. 4 shows, peaks at the mean value and tails off in proportion to distance from the mean value, while the present invention makes it possible to control the reception timing in such a way that it is not far removed from that vicinity. FIG. 5 compares the frequency of error in reception timing according to the present method and the conventional method, and it will be seen that the frequency of timing error between the timing of a time slot and reception timing is less with the method to which the present invention pertains than with the conventional method.

As has been described above, by providing a receiver, being of a type wherein the reception timing of a given slot is controlled on the basis of the error between the time slot reception time of the received signal and the reception timing, with a control adjustment means which reduces the amount of control of the reception timing in relation to the detected error, and in particular by taking the time average of each error detected by this control adjustment means during reception of a plurality of time slots, the present invention makes it possible to fix the error in the vicinity of the maximum frequency of timing delay distribution, even where there are variations in error resulting from variations in the arrival path of the received signal in multipath communication and similar conditions, thus effectively facilitating the overall reduction of errors of reception timing in the receiver.

What is claimed is:

1. A system for controlling reception timing of time slots in a TDM receiver, the system comprising: a timing error detection means for detecting errors between a time slot reception time and reception timing of received signals; a reception timing control means for controlling the reception timing of a given time slot by means of the output of said timing error detection means on reception of the preceding time slot; and a control adjustment means for adjusting the amount of control of the reception timing in relation to errors detected by the timing error detection means.

2. The system according to claim 1, wherein said control adjustment means takes the time average of the errors detected by the timing error detection means.

3. The system according to claim 2, wherein a weighting is applied to each error when receiving a plurality of preceding time slots, the weighting being lower in direct proportion to the age of the error.

4. The system according to claim 3, wherein the weighting value is 1 for the base time slot, and a value obtained by multiplying this by the number of preceding time slots.

5. The system according to claim 2, wherein the number of time slots wherein the errors are targeted for the taking of time averages is determined on the basis of cycles of changing environmental conditions, fading frequencies and detected time slot frequencies.

6. A method for controlling reception timing of time slots in a TDM receiver, the method comprising the steps of:

detecting errors between a time slot reception time and reception timing of received signals by means of a timing error detection means;

controlling the reception timing of a given time slot by means of the output of said timing error detection means on reception of the preceding time slot; and adjusting the amount of control of the reception timing in relation to errors detected by the timing error detection means.

7. The method according to claim 6, wherein the adjusting step comprises taking the time average of the errors detected by the timing error detection means.

8. The method according to claim 7, further comprising the step of applying a weighting value to each error when receiving a plurality of preceding time slots wherein the weighting is lower in direct proportion to the age of the error.

9. The method according to claim 8, wherein the weighting value is 1 for a base time slot, and a value obtained by multiplying this by the number of preceding time slots.

10. The method according to claim 7, further comprising the step of determining the number of time slots wherein the errors are targeted for the taking of time averages on the basis of cycles of changing environmental conditions, fading frequencies, and detected slot frequencies.

* * * * *